United States Patent Office 3,490,077
Patented Jan. 20, 1970

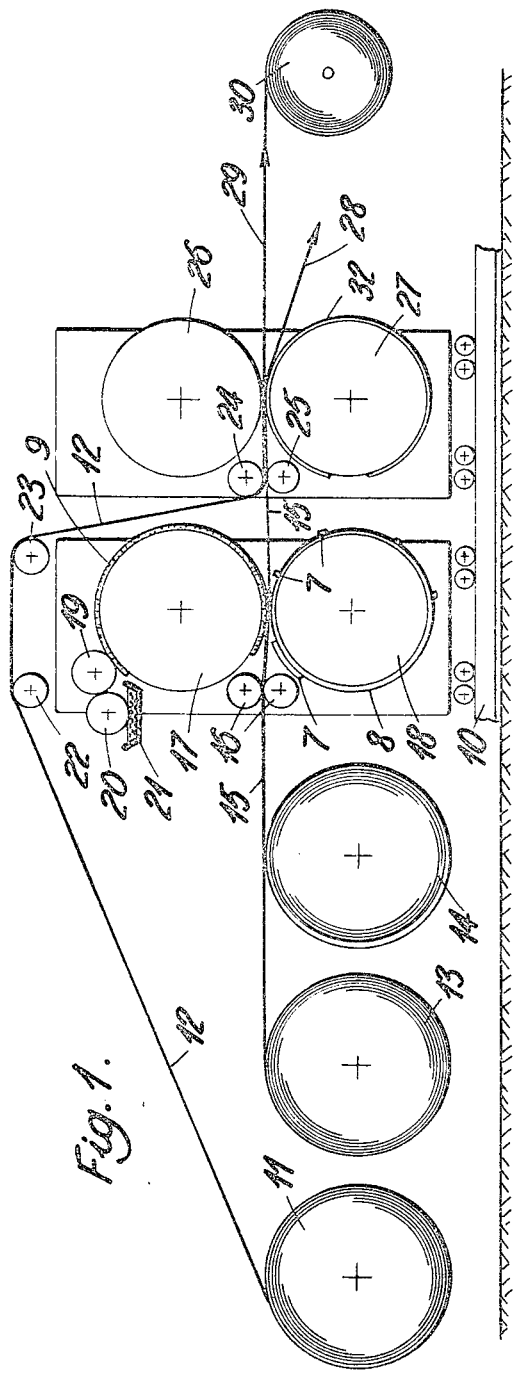

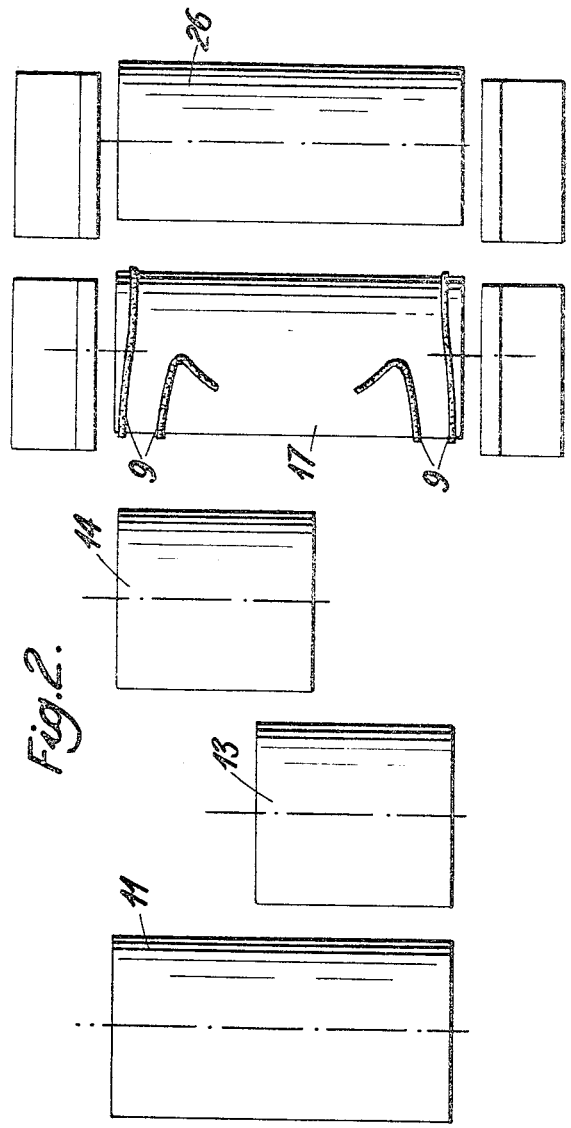

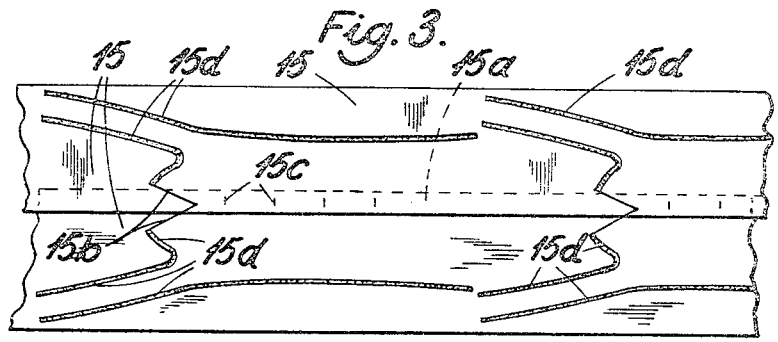
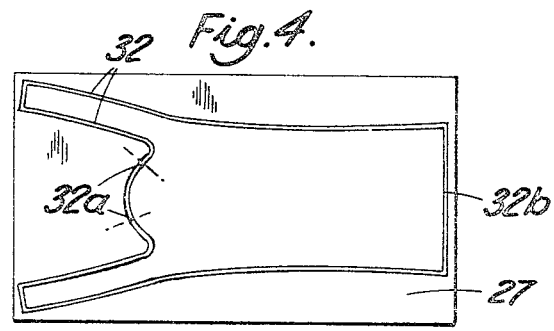
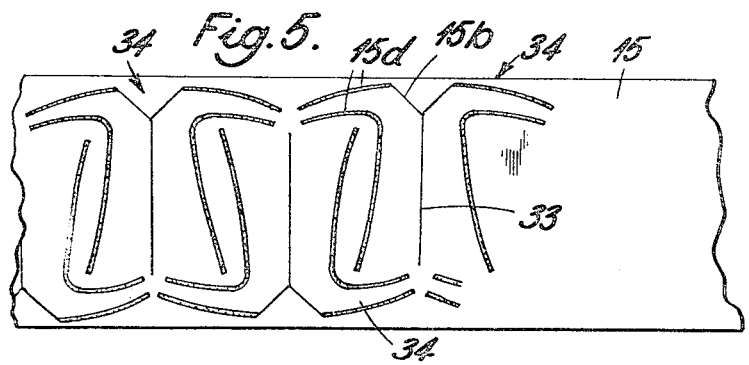

3,490,077
MANUFACTURE OF ARTICLES FROM SHEET MATERIAL
Philip Brown, 31 Princess Court, Wembley, England
Filed July 11, 1966, Ser. No. 564,051
Claims priority, application Great Britain, July 16, 1965, 30,378/65; Aug. 26, 1965, 36,759/65
Int. Cl. A41d 27/00
U.S. Cl. 2—243
12 Claims

ABSTRACT OF THE DISCLOSURE

The invention provides a method of manufacturing garments having a back part and two fore parts from sheet material which consists in feeding continuous stretches of the material through an apparatus so that they meet one another in superimposed relationship and are pressed together along lines and are cut along those lines and at least one of the stretches is fashioned before it is applied to another stretch.

---

This invention relates to the manufacture of articles from sheet material and particularly to the manufacture of garments including overalls and has for certain of its objects to accelerate production and to reduce the cost.

According to this invention a method of manufacturing articles from sheet material consists in feeding continuous stretches of the material through an apparatus so that they meet one another in superimposed relationship and are pressed together along lines and are cut along those lines and at least one of the stretches is fashioned before it is applied to another stretch. The term "fashioned" is intended to include cutting, crimping, embossing or hollow pressing the material to a required shape at those locations which are not to receive the adhesive.

At least one of the stretches has applied to it an adhesive along the lines delineating the finished article. Alternatively at least one of the stretches is formed from material of such a character that when pressed along said lines against another stretch, said pressure causes said stretches to stick together along said lines.

Pressing together of the stretches and their cutting to final shape may be carried out simultaneously.

In applying the invention to the manufacture of a garment having a back part with or without parts of the arms to which is secured two fore parts disposed side by side width or without parts for the arms, there are fed side by side through the apparatus two stretches of material from which the fore parts are formed bringing the two stretches into superimposed relationship with a third stretch after the two stretches have been fashioned.

An alternative method of manufacturing a garment having a back part with or without arms to which is secured two fore parts both side by side with or without parts of the arms, two stretches are fed side by side through apparatus in which the fore parts are fashioned, which stretches are then brought into superimposed relationship with a third stretch after the two stretches have been fashioned.

Each of the two stretches for forming the fore parts may be fashioned before meeting the strip from which the back part is formed.

Adhesive may be applied to the stretches for forming the fore parts along lines delineating the shape of the garment before, after or during their fashioning whereafter the superimposed strips are cut along the lines of the adhesive.

In one specific method of manufacturing a garment having a back part with or without parts for the arms and two fore parts with or without parts for the arms consist in feeding two stretches of material in superimposed relationship through an apparatus which repeatedly fashion slits across the width of the strip so as to form fore parts and successively apply adhesive to one of the stretches so as to delineate the finished garments the lengths of which is in the direction of the height of the wearer extending across the width of the stretches and bringing the stretches together so as to cause them to stick together along the lines of adhesive and finally cuttin out the garments along the lines of the adhesive.

In any of the arrangements referred to above the stretches of the material fed from supply rolls continuously through the machine and are subjected repeatedly to said succession of operations whereby a succession of articles are continuously produced.

An apparatus for carrying out the method as set out above comprises at one end of the machine a number of spools or the like for rolls of material spaced apart in the direction of travel of the material, means for spacing apart the stretches of material leaving the spools, means for repeatedly fashioning one of the stretches, means for applying adhesive to it or to another stretch, along lines delineating the shape of the finished article, means for bringing the stretches together and for applying pressure to them to cause them to stick together along the lines of adhesive, and means for cutting the stretches along the lines or adjacent the lines of adhesive.

An apparatus for manufacturing a garment from three stretches of material so that the garment has a back part stuck to two fore parts comprises a stand, at one end of which is mounted a spool or the like carrying a roll of material of sufficient width to accommodate the back part of a garment and two spools of narrower width which are disposed away from the first said spool and within its width and carrying rolls of material for the fore parts of the garment, means for applying an adhesive to the material drawn from the latter two rolls and/or the material from the first said roll along lines delineating the garment, means for successively fashioning portions of the material drawn from the latter two rolls, means for bringing the two stretches of material from which the fore parts are to be formed into contact with the stretch of material from which the back portions are formed, so that they stick together along the lines of adhesive and cutting mechanism for cutting the superimposed stretches of material along the lines of adhesive.

An alternative form of apparatus and arranged for manufacturing a garment from two superimposed stretches so that the garment has a back part and a front part, comprises a stand at one end of which are mounted two spools or the like with their axis parallel and spaced apart which spools carry rolls of material means for spacing apart the stretches of material leaving the spools, means for applying adhesive to the material drawn from one or both rolls along lines delineating the finished garment in such a manner that the length of the garment in the direction of the height of the wearer extends along or across the length of the stretches drawn from the rolls, means for successively fashioning portions drawn from one or both rolls of material, means for pressing two stretches of material together so that they stick along the lines of adhesive and cutting mechanism or cutting the superimposed stretches of material along the lines of adhesive.

The invention includes within its scope a garment manufactured according to the method and apparatus as set out above and which may be formed from felted fibres such as paper.

The following is a more detailed description of alternative forms of apparatus for manufacturing garments reference being made to the diagrammatic drawings in which:

FIGURE 1 is a side elevation of one form of apparatus;

FIGURE 2 is a plan of the arrangements shown in FIGURE 1;

FIGURE 3 is a plan view of the two stretches of material which have had adhesive applied to them;

FIGURE 4 is a development of the roller provided with the cutters for cutting out the completed garment from the superimposed stretches; and FIGURE 5 is a similar view to FIGURE 3 but in which a single stretch has been fashoned to provde two fore parts which extend across the stretch.

Mounted on the left hand end of a stand 10 is a spool or the like 11 for a roll of material for example paper which is to form the back of the garment with or without parts of the arms and from which is continuously drawn a stretch 12. The width of the stretch is sufficient to take the width of the garment. Mounted to the right of the spool 11 is a spool or the like 13 carrying a roll of material such as paper of sufficient width to take one of the fore parts of the garment with or without a part of one arm and which roll is of a narrow width than the roll on the spool 11. Mounted on the right of the spool 13 is a spool 14 for taking a roll for the other fore part of the garment with or without a part of another arm and which spool is arranged in staggeded relationship to the spool 13. The overall width of these two overlapping spools 13, 14 is substantially the same as the width of the spool 11. The two stretches 15 from these rolls are fed between two guide rollers 16 and then pass between two rollers 17, 18 of similar width to or greater than the spool 11 or the overall width of the spools 13 and 14. The upper roller has secured to its rules 9 formed from resilient absorbent material such as foamed rubber or plastics and so shaped as to delineate the contour of the garment with or without arms to be produced and so that the length of the delineated garment in the direction of the height of the wearer extends along the length of the material to which the adhesive is to be applied. Apart from these rules the upper roller has a smooth hard surface for exampled hardened steel. A thermosetting liquid dispersion of acrylic polymer is applied to those rules by a roller 19 which contacts another roller 20 which dips into a trough 21 containing the liquid dispersion. Thus there is applied to the two stretches of the fore parts 15 lines of adhesive delineating the final shape of the garment with or without arms. The lower roller 18 has secured to it a two part detachable shell 8 to which are attached cutter blades 7 shaped to fashion the two fore parts, for example, to cut out a V-neck and bottom holes.

The stretch 12 drawn off the spool 11 is guided over the top of the cutting mechanism by rollers 22, 23 and then passes downwardly to meet the two stretches 15 which has been fashioned and have had adhesive applied to them. The superimposed stretches 12 and 15 then pass between heated and/or pressure rollers 24, 25 so as to cause the stretches to stick together along the lines of adhesive.

The nature of the adhesive and the degree of pressure employed is sufficient to cause the adhesive to stick to the other garment part for example to penetrate into the interstices of the material of the stretch 12.

The stretches thus stuck together pass between two further rollers 26, 27 the lowermost roller being provided with cutter blades 32 which engage the hardened surface of the roller 26 and in so doing cut out the finished garment along or adjacent the lines of adhesive. The separated garments pass along a chute or conveyor 28 to a location from which they may be removed and further treated and packed, and the stretches 29 from which the garments have been cut is collected on a take-up spool 30.

The various spool and rollers throughout the apparatus are driven through suitable transmission from one or more driving motors not shown.

It will be seen from FIGURE 3 which represents the two stretches 15 of material from which the fore parts of the garment are formed that the stretches overlap as indicated by the dotted line 15a and that the fashioning operation has resulted in slits having been cut along the lines 15b which ultimately form a part of the neck portion. Also small slits 15c have been formed through the overlapping portions of the stretches which form button holes, and for receiving stud like buttons respectively. The adhesive has been applied along the lines 15d and it will be noted that the length of the delineated garment in the direction of the length of the wearer extends along the length of the stretches 15 and also the lengths of the arms extend in that direction.

Referring to FIGURE 4 which represents a development of the cutting roller 27 the cutter blades 32 in addition to extending along the lines of adhesive applied to the fore parts also extend at 32a to cut out the neck hole and at 32b at the lower end of the garment.

In the case where the material for the back part or fore parts or both has thermoplastic properties the rollers 19, 20 and the trough 21 for adhesive may be dispensed with, also the absorbent rules 9 on the roller may be dispensed with and means are provided for heating either or both of the rollers 26, 27 so that the effect of the cutters 27 in pressing the material against the hard surface of the rollers 26 is both to weld or stick the stretches of material along the required lines and also to cut the material through the weld but leaving the stretches welded together.

It will be appreciated that various other modifications may be made to details of construction without departing from the scope of the invention. For example instead of the roller 17 being provided with absorbent rules 9 for the adhesive it might be engraved in the manner of intaglio printing for receiving the adhesive. Also instead of the adhesive being applied to the two fore parts whilst they are being formed it might be applied to them after they have been formed in which case an additional pair of rollers would be provided. Alternatively the adhesive could be applied to the stretch of the material from which the back part is to be formed in which case the adhesive might be applied to rules on an enlarged roller 25 by rollers similar to the rollers 19 and 20 receiving adhesive from a trough similar to 21.

It is also possible to form a garment from two stretches of material in which case one of the spools 13 and 14 is dispensed with and the remaining spool and the roll of material therein is of similar width to the spool 11 and its material. In this case the length of the garment delineated by the adhesive on the stretch 15 and the mode of fashioning may extend either along the length of the stretch or across the stretch.

In the case where the garment requires to have two fore parts the fashioning of the single stretch 15 by the rollers 17, 18 form slits 33 in the stretch in a direction across its width as shown in FIGURE 5 and in this case the adhesive delineating the arms extend in a direction along the length of the stretch. In order that the garments delineated by the adhesive may overlap one another as shown in FIGURE 5, the roller 17 is formed with rules which will apply adhesive for two complete garments indicated generally at 34 one being inverted with respect to the other. Overlap can also be achieved by providing the rolls 17 with adhesive applying rules which will delineate three four or five garments inverted with respect to one another.

Similarly the cutting roller 27 will return to have a similar number of sets of cutters to the adhesive applying rollers.

Although slitting is the only form of fashioning so far referred to the material could be example be hollow pressed by suitably shaping the rollers 17 or 18 or by the provision of additional rollers.

The material could also be fashioned by crimping, embosing or similar processes.

The two stretch arrangement is particularly applicable to swim suits for ladies where support for the bust is required, in which case the main parts of the swim suit are formed from two stretches brought face to face and at least one of them has applied thereto the substance for sticking them together along seam lines extending along the sides of the body and along portions of the legs and a further stretch of comparatively small width is disposed between the back and front part stretches and has applied to it at intervals along its length and across its width sticking material which sticks the additional stretch to the front part stretches at locations between the breasts of the bust.

Also instead of the above operations being carried out by co-operating pairs of rollers they might be carried out by pairs of relatively reciprocating platens, on which the rules and cutters are mounted. In the case where rollers with rules are employed where larger garments are required larger diameter rolls could be employed in which case adjustable mountings might be required for the rolls or where the rolls co-operate with flat platens means may be provided for moving the platens towards and away from the rolls.

The free edges of the fore parts of the garments may be folded back and press studs or other fasteners may be formed in the resulting double material by a stamping operation. It might also be necessary to trim the lapels and to stick on pockets. Although a garment of this kind may be disposable when dirty the buttons or press studs could be used again.

A standard length of garment could be produced which could be shortened by the wearer merely by the use of a pair of scissors.

Other garments such as trousers could be produced by a similar method and the material cut off around the seams could be utilised in the production of gussets and such like required for finishing some garments.

The invention is also applicable to making garments or parts of garments formed from woven or knitted fabric.

The above method of manufacture is applicable to many different articles.

For example multi-layer bags may be formed where first of all two stretches are stuck together along seam lines delineating the shape of the bags and these stuck layers may then be passed between two other layers which are stuck to them along said lines and so on until the required number of layers are built up whereafter the multistretches are passed through the cutting unit which cuts the multi-layers around the seam lines.

Yet again the method is applicable for forming, bottles, for example urine bottles for hospitals, in which case the sticking substance is applied along lines delineating the shape of the bottles.

A still further application is to upholstering where padding material is located between two layers of material which are stuck together along suitable lines so as to retain the padding against displacement.

Also mattress covers may be formed by the above method.

The nature of the material of the aforementioned stretches is selected in accordance with the article to be formed and the nature of the sticking substance is selected in accordance with the material. In general the material is of such a character as to absorb the sticking substance.

I claim:

1. A method of manufacturing a succession of garments having a back and a front divided longitudinally into two parts comprising the steps of:
    (a) feeding two front forming stretches in side-by-side relation and a back forming stretch into superimposed relationship at an assembly station,
    (b) adhering the stretches together at the assembly station along lines delineating the outer contours of garments extending along the stretches with the two front forming stretches forming respectively the two front parts of the garments,
    (c) cutting the stretches along said lines to separate the garments from the stretches; and
    (d) fashioning the front forming stretches where the front parts of the garments differ from the back parts before the front forming stretches reach the assembly station, by forming cuts extending part way across the front forming stretches.

2. A method of manufacturing a succesion of garments as claimed in claim 1 wherein the two front forming stretches are fed to the assembly station in partially overlapping relationship.

3. A method of manufacturing a garment according to claim 1 wherein adhesive is applied to the stretches for forming the fore parts along lines delineating the shape of the garment before they reach the assembly station whereafter the stretches are cut along the lines of adhesive.

4. A method of manufacturing a garment according to claim 3 wherein said adhesive is applied to the stretches for forming the fore parts along said lines delineating the shape of the garment after their fashioning whereafter the stretches are passed to the assembly station.

5. A metod of manufacturing a garment according to claim 3 wherein adhesive is applied to the stretches for forming the fore parts along lines delineating the shape of the garment during their fashioning whereafter the stretches are passed to the assembly station.

6. A method of manufacturing a succession of garments having a back and a front divided into two parts which method comprises the steps of:
    (a) passing a first stretch of material from which the front part is to be formed to a first station,
    (b) applying adhesive to the first stretch of material at the first station along lines which delineate seam lines of the garment front having an outline located wholly within the width of the stretch,
    (c) cutting said first stretch at the first station along a line extending between positions spaced inwardly of the edges of the stretch to form the two parts of the garment front,
    (d) feeding said stretch into superimposed relationship at an assembly station with another stretch from which the garment backs are to be formed, and
    (e) pressing the stretches together along said lines of adhesive and severing the superimposed stretches around the outline of the garments at the assembly station.

7. A method according to claim 6 wherein the first stretch is subjected to additional cutting at said first station at locations where the front of the garment differs from the back.

8. A method according to claim 6 wherein said one stretch is formed from thermoplastic material.

9. A method according to claim 6 wherein the adhesive is a thermo-sensitive adhesive and the pressing together of said stretches along said lines is carried out under elevated temperature.

10. A method of manufacturing a succession of garments having a back and a front, which method comprises the steps of:
    (a) passing first stretch material from which the front part is to be formed to a first station,
    (b) applying adhesive to the first stretch material at the first station along lines which delineate seam lines of the garment front having an outline located wholly within the width of the stretch,
    (c) fashion cutting said first stretch material at the first station in a path spaced inwardly of at least one of the edges of the stretch material to form the garment front, (d) feeding said cut stretch material into superimposed relationship at an assembly station with another stretch material from which the garment backs are to be formed, and (e) pressing the stretch materials together along said lines of adhesive and severing the superimposed stretch materials around the outline of the garments at the assembly station.

11. A method according to claim 10 wherein said fashion cutting is in the outline of the garment.

12. A method according to claim 10 wherein the line of severing connects with the line of fashion cutting made at the first station.

References Cited

UNITED STATES PATENTS

| | | |
|---|---|---|
| 2,668,294 | 2/1954 | Gilpin. |
| 3,032,773 | 5/1962 | Piazze _____ 2—49 |
| 3,146,465 | 9/1964 | Hummel _____ 2—49 |
| 2,993,528 | 7/1961 | Plant _____ 156—291 |
| 3,156,927 | 11/1964 | Grimm et al. _____ 2—243 |
| 3,236,713 | 2/1966 | Taff _____ 156—291 |

ALFRED R. GUEST, Primary Examiner